US011366981B1

(12) United States Patent
Paz-Perez

(10) Patent No.: US 11,366,981 B1
(45) Date of Patent: Jun. 21, 2022

(54) DATA AUGMENTATION FOR LOCAL FEATURE DETECTOR AND DESCRIPTOR LEARNING USING APPEARANCE TRANSFORM

(71) Applicant: Apple Inc., Cupertino, CA (US)

(72) Inventor: Lina M. Paz-Perez, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/111,157

(22) Filed: Dec. 3, 2020

Related U.S. Application Data

(60) Provisional application No. 62/942,930, filed on Dec. 3, 2019.

(51) Int. Cl.
*G06K 9/00* (2022.01)
*G06K 9/62* (2022.01)
*G06V 30/194* (2022.01)

(52) U.S. Cl.
CPC ......... *G06K 9/6232* (2013.01); *G06V 30/194* (2022.01)

(58) Field of Classification Search
CPC ............................ G06K 9/6232; G06V 30/194
See application file for complete search history.

(56) References Cited

U.S. PATENT DOCUMENTS

| 2017/0243376 | A1* | 8/2017 | Jamriska | G06T 11/001 |
| 2018/0068463 | A1* | 3/2018 | Risser | G06T 7/45 |
| 2018/0268256 | A1* | 9/2018 | Di Febbo | G06T 7/001 |
| 2020/0183035 | A1* | 6/2020 | Liu | G06N 20/00 |

OTHER PUBLICATIONS

Handa, et al., "gvnn: Neural Network Library for Geometric Computer Vision," arXiv: 1607.07405v3 [cs.CV] Aug. 12, 2016.
Qi, et al., "PointNet: Deep Learning on Point Sets for 3D Classification and Segmentation," The IEEE Conference on Computer Vision and Pattern Recognition (CVPR), 2017, 652-660.
Qi, et al., "PointNet++: Deep Hierarchical Feature Learning on Point Sets in a Metric Space," 31st Conference on Neural Information Processing Systems (NIPS 2017).
Schonberger, et al., "Semantic Visual Localization," 2018 IEEE/CVF Conference on Computer Vision and Pattern Recognition, Jun. 18-23, 2018.
Taira, et al., "InLoc: Indoor Visual Localization with Dense Matching and View Synthesis," The IEEE Conference on Computer Vision and Pattern Recognition (CVPR), 2018, pp. 7199-7209.
Taylor, Miguel, "Geometric deep learning: Convolutional Neural Networks on Graphs and Manifolds," Retrieved from the Internet: URL: https://towardsdatascience.com/geometric-deep-learning-convolutional-neural-networks-on-graphs-and-manifolds-c6908d95b975 [Retrieved on Dec. 30, 2019].

* cited by examiner

*Primary Examiner* — Dhaval V Patel
(74) *Attorney, Agent, or Firm* — Blank Rome LLP

(57) ABSTRACT

Providing localization data includes obtaining a first image of a scene associated with a first condition, determining one or more target conditions, and applying an appearance transfer network to the first image to obtain one or more synthesized images comprising the scene, wherein the scene is associated with the one or more target conditions in the synthesized image. A first patch is selected from the first image, wherein the first patch comprises a keypoint, and an image location is determined for the first patch. Then one or more additional patches can be obtained using the synthesized images and the image location. A descriptor network may be trained to provide localization data based on the first patch and the one or more additional patches.

20 Claims, 6 Drawing Sheets

DATA AUGMENTATION FOR LOCAL FEATURE DETECTOR AND DESCRIPTOR LEARNING USING APPEARANCE TRANSFORM

BACKGROUND

This disclosure relates generally to image processing. More particularly, but not by way of limitation, this disclosure relates to techniques and systems for utilizing an appearance transform network to generate data for descriptor learning.

Computer vision often relies upon identification of keypoints in an image, from which feature descriptors can be determined to obtain information in a scene. Typically, feature descriptors may be determined using a descriptor network which has been trained to identify feature descriptors from reference images. For example, images may be captured of a scene during different times or while the scene has different characteristics. Those images may then be utilized to identify keypoints, which may be utilized for detection, image retrieval, localization, and the like.

DETAILED DESCRIPTION

Figure 1:
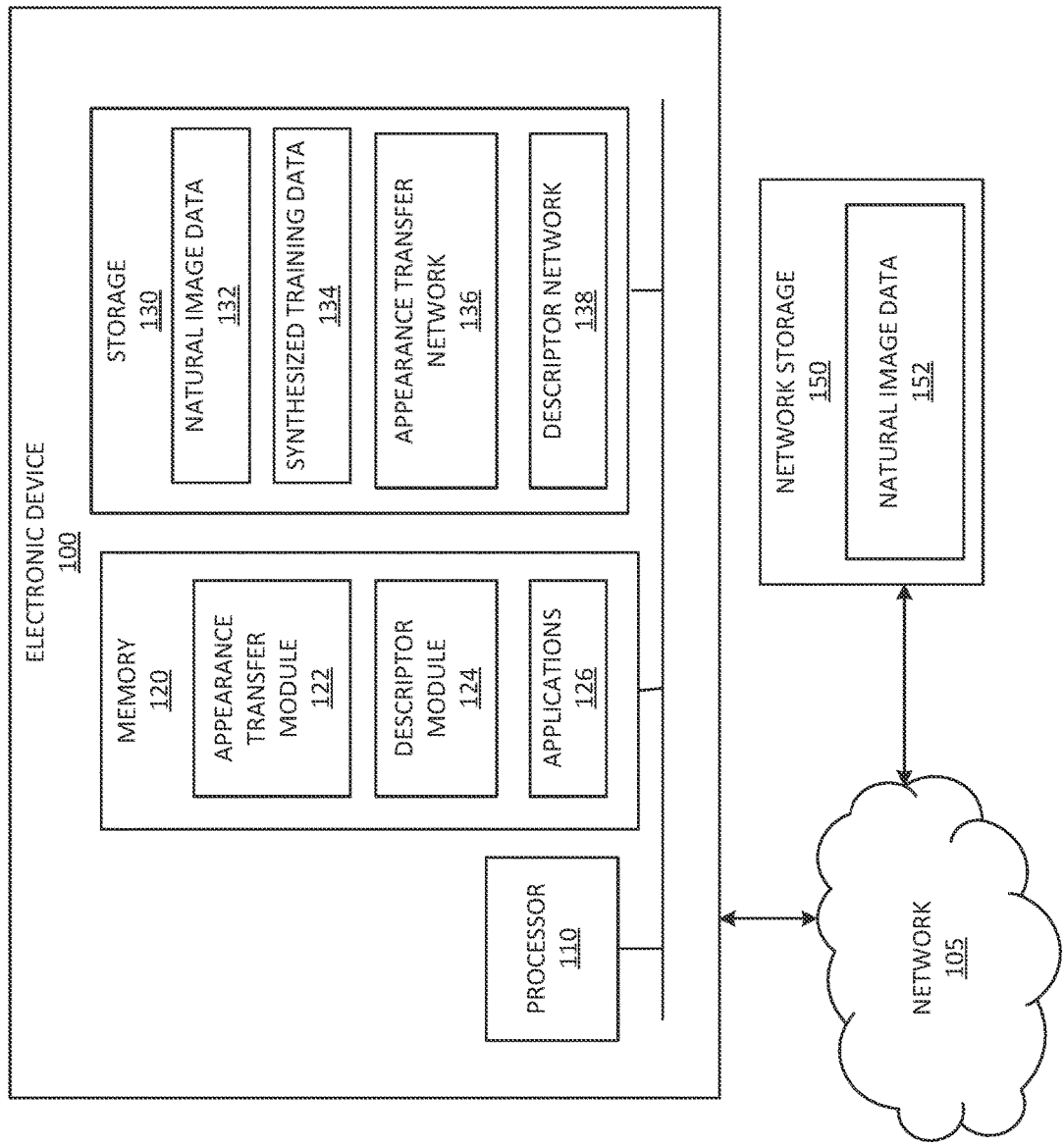
FIG. 1 shows, in block diagram form, a simplified system diagram according to one or more embodiments.

This disclosure pertains to systems, methods, and computer readable media to augment data for use in local feature detector and descriptor learning using appearance transform. To train a descriptor network to provide descriptors for a given image, training data, such as reference images, may be utilized to train the network. While traditional techniques involve taking multiple images of a scene from roughly the same location during different environmental conditions, acquiring enough data to sufficiently train the network can be time consuming. Further, the images of the scene capturing different conditions may not be exactly aligned, and computational resources must be spent to align the image data.

The following disclosure is directed to a technique for leveraging image appearance transfer to generate synthetic images from a particular naturally captured image. The appearance transfer network may be trained to take an image, such as a naturally captured image of a scene, and a target environmental condition, and generate a synthetic image of the scene in the target condition. Then, the original images and the synthetic images that are generated based on the original images, may be used as training data for a descriptor network to better identify feature descriptors in a scene. In one or more embodiments, the descriptor network may be trained with patches from the images, which include keypoints. Because the synthetic data is generated from the original image, the same image location utilized in one of the images will be the same for the patches in all the images because by definition the images are aligned.

For purposes of this disclosure, a condition refers to an environmental condition such as a particular season, lighting, time of day, or other characteristic that impacts the appearance of a scene.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of an electronic device 100 is depicted, communicably connected to a network storage 150 over a network 105, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. Electronic device 100 and network storage 150 may additionally, or alternatively, include one or more server devices or other network computing devices within which the various functionality may be contained, or across which the various functionality may be distributed. Electronic device 100 may be connected to the network storage 175 across a network 105. Illustrative networks include, but are not limited to, a local network such as a universal serial bus (USB) network, an organization's local area network, and a wide area network such as the Internet. According to one or more embodiments, electronic device 100 is utilized to train a descriptor model to provide localization information for an image. It should be understood that the various components and functionality within electronic device 100 and network storage 175 may be differently distributed across the devices, or may be distributed across additional devices.

Electronic Device 100 may include processor, such as a central processing unit (CPU) 110. Processor 110 may be a system-on-chip such as those found in mobile devices and include one or more dedicated graphics processing units (GPUs). Further processor 110 may include multiple processors of the same or different type. Electronic device 100 may also include a memory 120. Memory 120 may each include one or more different types of memory, which may be used for performing device functions in conjunction with processor 110. For example, memory 120 may include cache, ROM, RAM, or any kind of transitory or non-transitory computer readable storage medium capable of storing computer readable code. Memory 120 may store various programming modules for execution by processor 110, including training module 122. Electronic device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Electronic device 100 may also include one or more cameras or other sensors, such as depth sensor, from which depth of a scene may be determined. In one or more embodiments, each of the one or more cameras may be a traditional RGB camera, or a depth camera. Further, cameras may include a stereo- or other multi-camera system, a time-of-flight camera system, or the like which capture images from which depth information of a scene may be determined. Electronic device 100 may allow a user to interact with computer-generated reality (CGR) environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display device may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 130 may be utilized to store various data and structures which may be utilized for providing a technique for providing localization information for an image. Storage 130 may include, for example, natural training data 132. Natural training data 132 may include, for example, images that are naturally captured (i.e., not synthetic images) by electronic device 100 or another device, by which various networks may be trained. As shown, network storage 150 may also include natural image data 152. Natural training data may be provided by users, and/or may be obtained from provided data sets. For example, Photo Tourism is a system that collects and provides images of scenes from large, unorganized data sets.

Storage 130 may also include synthesized training data 134. In one or more embodiments, one or more of the images from the natural training data may be augmented to generate one or more synthesized images, which are included in the synthesized training data. The synthesized training data may include, for example, images of the same scenes captured in natural training data 132, but under different conditions, such as different times of day, weather conditions, lighting, other environmental conditions, and the like.

In addition to the training data, storage 130 may also include the networks utilized to provide a technique for providing localization information. In particular, storage 130 may include the appearance transfer network 136 and the descriptor network 138. According to one or more embodiments, the appearance transform network may be trained to intake an image of a scene and a target condition, and generate a synthesized image of the scene based on the target image. In some embodiments, the target condition may be associated with illumination of a scene. For example, an image of a park during the spring may be input along with a target condition of "Winter" to generate a synthesized image of the park in the winter. In doing so, the camera angle and the landmarks of the scene remain the same across the real image and the synthesized images. The descriptor network may be a network that is trained to provide localization information. In one or more embodiments, the descriptor network may be trained on patches of image data that relate to keypoints. The patches may be generated by a detector that detects keypoints. Although the various components described within storage 130 are depicted as within a single storage, it should be understood that he various components, or data within the components may be distributed across multiple storage devices, or even across multiple electronic devices, for example across a network.

According to one or more embodiments, memory 120 may include one or more modules that comprise computer readable code executable by the processor(s) 110 to perform functions. The memory may include, for example an appearance transfer module 122 which may be used to train and utilize an appearance transfer network 136. the appearance transfer module 122 may initially train the appearance transfer network 136 using data sets of images of common scenes associated with a variety of conditions, such as natural training data 132. As such, the appearance transfer network 136 may be trained to map images to conditions.

Once the appearance transfer module 122 is initially trained, it may be utilized to generate synthesized training data 134.

The memory 120 may also include descriptor module 124 which may be used to train and/or utilize the descriptor network 138. According to one or more embodiments, the descriptor module may utilize the synthesized training data 134, along with the real image data from which the synthesized training data was synthesized. In doing so, the descriptor module 124 may crop the images to form patches. Whereas traditional efforts may require aligning the images, because the synthesized training data is generated based on a real image, the various images are aligned. Aligning the sequence of images may include determining a trajectory associated with the sequence. Accordingly, the descriptor module 124 may detect a patch with a keypoint in one image, and then utilize the same image location to obtain the patches from the additional images. The process may be repeated for additional keypoints. The patches may then be used to train the descriptor network 138 to provide localization data for a given image.

Although electronic device 100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
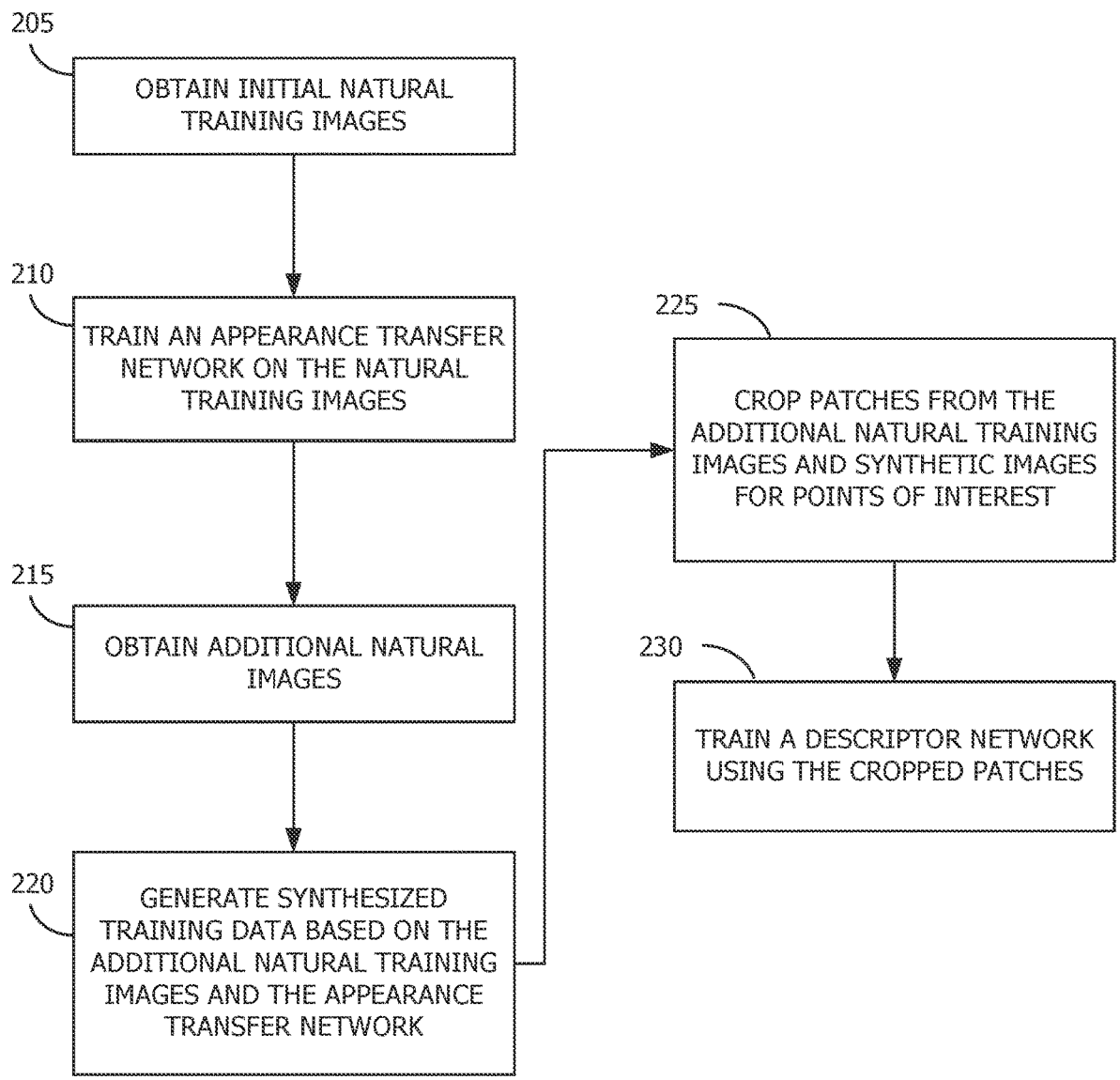
FIG. 2 shows a flowchart in which an appearance transfer network and a descriptor network are trained, according to one or more embodiments.

Referring to FIG. 2, a flowchart is illustrated in which a descriptor network is trained to provide localization information from an image. Although the various processes depicted in FIG. 2 are illustrated in a particular order, it should be understood that the various processes may be performed in a different order. Further, not all the processes may be necessary to be performed to train the descriptor network. For purposes of explanation, the various processes will be described in the context of the components of FIG. 1, however it should be understood that the various processes may be performed by additional or alternative components.

The flowchart begins at 205, where the appearance transfer module 122 obtains initial natural training images. The initial natural training images may include images of one or more particular scenes having different conditions. As an example, a scene may be captured at different times of the day, or during different seasons, or having various different environmental factors, such as seasonal weather. In one or more embodiments, the natural training images may be captured by a camera of electronic device 100, and/or may be obtained from an additional data source, such as natural image data 152 of network storage 150.

The flowchart continues at 210, where an appearance transfer network is trained on the natural training images. According to one or more embodiments, the network may be trained on sets of images of common scenes. For example, a first set of images for a first scene, a second set of images for a second scene, and the like. The sets of images for a particular scene may depict the scene under differing conditions. For example, the images may be captured during different times of day, during different seasons or weather events, under different lighting, and the like. The appearance transfer network may be trained to map an image to a particular condition. An example is the use of the CycleGAN technique, which involves training a type of generative adversarial network ("GAN") image-to-image translation models in an unsupervised manner. By training the network on the sets of images containing the scene under various conditions, the appearance transfer network may be able to translate an image to a target condition.

At block 215, additional natural images are obtained, from which training data will be generated for a descriptor network. According to one or more embodiments, the additional natural images may be the same or different than those utilized to train the appearance transfer network 136. Similarly, the image data may be obtained from the electronic device 100, or from a remote location such as network storage 150 or another network device across network 105. It should be understood that the term "natural" indicates that the images are not processed by an appearance transfer network. As such, the images may be captured by a camera, and may be edited or augmented in some way prior to use during inference.

At block 220, the appearance transfer module 122 may generate synthesized training data based on the additional natural images and the appearance transfer network. The additional natural images may be input during inference for the appearance transfer network 136. In one or more embodiments, the appearance transfer network 136 may input the additional natural images, along with one or more target conditions, in order to generate synthesized image data that includes the scene of the input image under the various target conditions. As such, the result may be a set of images of a particular scene under the various conditions. Inference may be performed for each natural image for a set of conditions. The set of conditions utilized may be the same or different for the various input natural images. As such, for each scene, a set of images is obtained, which includes the natural images as well as the synthesized images generated from the natural image containing the scene.

The flowchart continues at block 225, where patches are cropped from the additional natural training data images and the synthetic images. The patches may be cropped to contain keypoints in the images. As will be described in greater detail below, a feature detector may be utilized to identify keypoints in an image. From there, patches may be identified for each keypoint. In one or more embodiments, an initial patch is identified from one of the images in a set of images for a scene. Then, an image location is determined for the patch, such as particular pixel coordinates or other pixel location, or a particular geometric area of the image. Then, according to one or more embodiments, the additional patches may be obtained based on the same image location in the remaining images of the set of images for the scene. As such, the descriptor module 124 may preserve computational resources by simply obtaining a same cropped area from each image in the set, rather than aligning the images to identify the corresponding portion of the patch from the initial image in the remaining images in the set of images for the scene.

The flowchart concludes at block 230, where the descriptor network is trained using the cropped patches from the additional natural training images and the synthetic images generated from the natural training images. According to one or more embodiments, learned descriptor networks may benefit from the described approach, such as L2-Net, LF-Net, SuperPoint, and the like. In one or more embodiments, the patches from the set of images for the scene may additionally or alternatively be used as training data for a feature detector network, or other networks which are trained from keypoints to provide localization information from an image.

Figure 3:
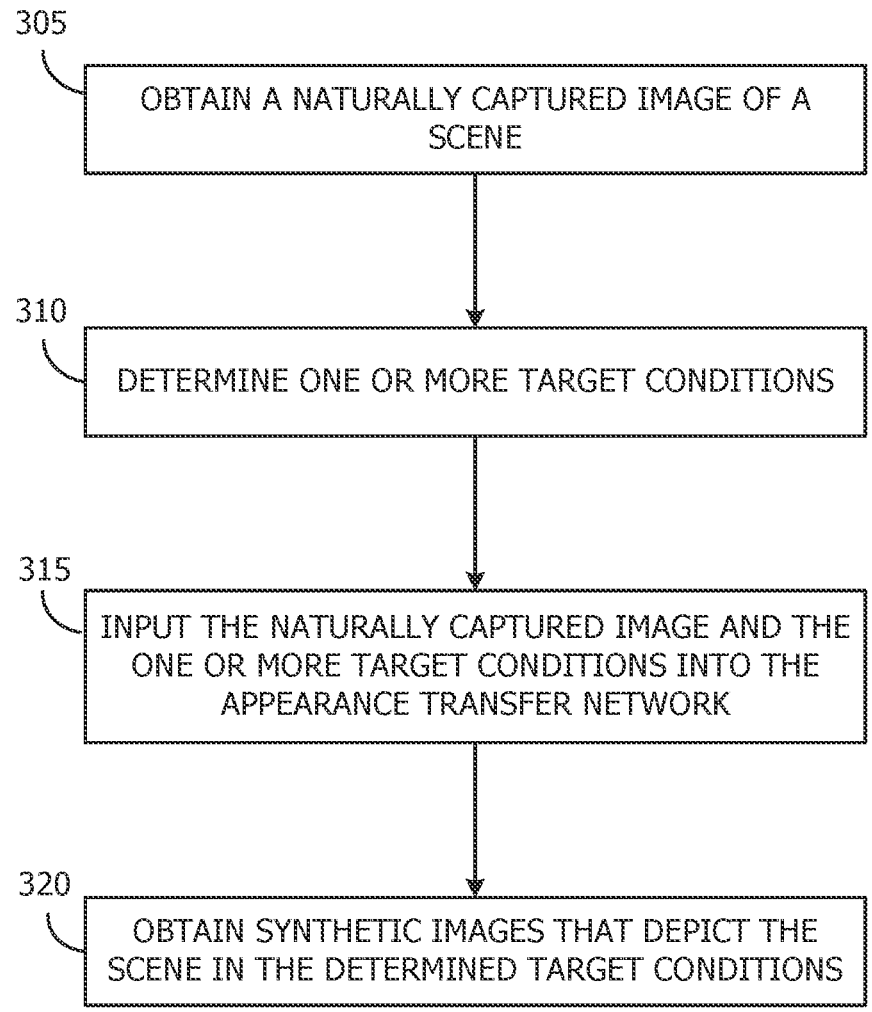
FIG. 3 shows a flowchart in which synthetic images are obtained, according to one or more embodiments.

FIG. 3 depicts the flowchart of a technique for obtaining synthetic images, according to one or more embodiments. In particular, FIG. 3 is directed to utilizing the appearance transfer network 136 during inference to generate synthesized training data, such as at block 220 of FIG. 2. Although the various processes depicted in FIG. 3 are illustrated in a particular order, it should be understood that the various processes may be performed in a different order. Further, not all the processes may be necessary to be performed to train the descriptor network. For purposes of explanation, the various processes will be described in the context of the components of FIG. 1, however it should be understood that the various processes may be performed by additional or alternative components.

The flowchart begins at block 305, where a naturally captured image of the scene is obtained. In one or more embodiments, the image may be any image for which synthesized data is to be generated and which will be used for training a descriptor network to provide localization information. As described above, the naturally captured image may be one captured by a camera of electronic device 100, or may be provided across a network, such as network 105.

At block 310, the appearance transfer module 122 determines one or more target conditions. According to one or more embodiments, the appearance transfer network 136 may be trained to map images to particular conditions. The conditions to which the input image is mapped may be predetermined, or may be determined dynamically, such as by user selection. The flowchart continues at block 315, where the appearance transfer module 122 inputs the naturally captured image and the one or more target conditions into the apparent transfer network. In one or more embodiments, the appearance transfer network 136 may be trained for a particular set of conditions, and only requires an image as input.

The flowchart concludes at block 320, where the appearance transfer module 136 to obtain synthetic images that the picked the scene in the determined target conditions. In one or more embodiments, an input image may be one image of a set of images which will be used for training data which capture a scene, where at least some of the images depict the scene from a same camera angle, but under different environmental or lighting conditions.

Figure 4:
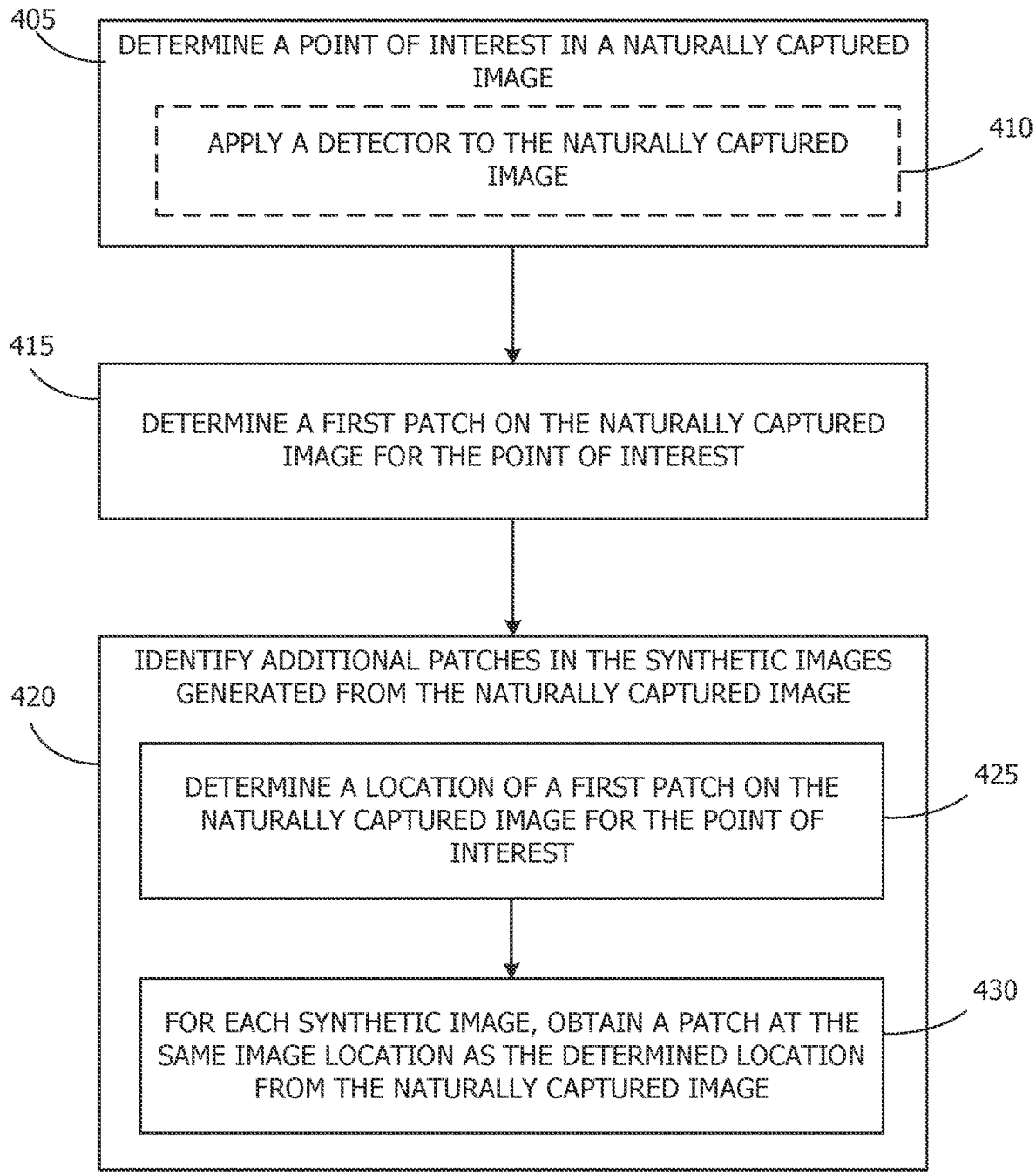
FIG. 4 shows a flowchart in which patches are obtain for training a detector network in accordance with one or more embodiments.

FIG. 4 depicts the flowchart for identifying patches to be used as training data for the descriptor network, according to one or more embodiments. Specifically, FIG. 4 depicts a flowchart for preparing the set of images to be utilized to train a network to provide localization information based on an image. Although the various processes depicted in FIG. 4 are illustrated in a particular order, it should be understood that the various processes may be performed in a different order. Further, not all the processes may be necessary to be performed to train the descriptor network. For purposes of explanation, the various processes will be described in the context of the components of FIG. 1, however it should be understood that the various processes may be performed by additional or alternative components.

The flowchart begins at block 405, where the descriptor module determines the keypoint in a naturally captured image. In one or more embodiments, at 410, a detector is applied to the naturally captured images to identify the key points. The detector may be a feature detector, such as SIFT or SURF, which identifies features, or points of interest (e.g., keypoints) in an image.

The flowchart continues at block 415, where the first patch is determined from the naturally captured image for the keypoint. However, the first patch may be determined from any of the images of a particular scene. For example, the first batch may be obtained from one of the synthetic images generated based on the naturally captured image of the scene.

The flowchart concludes at block 420, where the descriptor module 124 identifies additional patches in the synthetic images (and, if necessary, the naturally captured image from which the synthetic images were generated). In one or more embodiments, at block 425, the descriptor module 124 determines the location of the first patch on one of the images for the keypoint. As an example, a particular grid of pixels with corresponding intensity values, or a particular geometric portion of the image may be determined. Then, at block 430, the descriptor module 124 obtains the patch at the same location as the determined location of the initial patch from the first image. For example, because the images will naturally be aligned, a particular set of pixels may be used as the patch in each image of the scene containing the key point.

Figure 5:
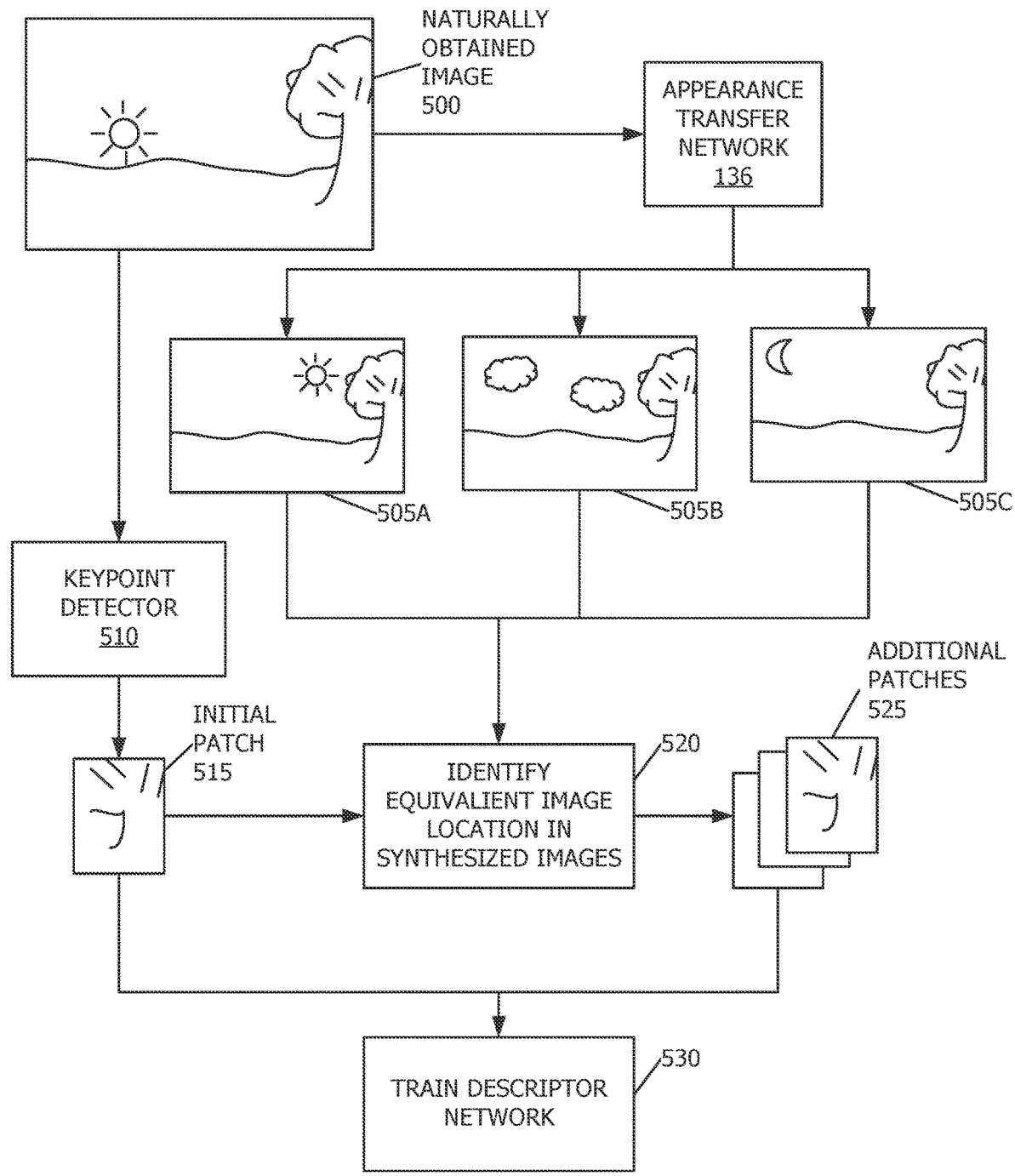
FIG. 5 shows a flow diagram illustrating a training technique for a descriptor network, in accordance with one or more additional embodiments.

Referring to FIG. 5, a flow diagram is illustrated in which a descriptor network is trained with real and synthetic image data. Although the flow diagram contains specific components and processes, it should be understood that the various components and processes are depicted for exemplary purposes. As such, the particular components and processes of FIG. 5 should not be considered limiting to the disclosure.

The flowchart diagram begins with naturally obtained image 500. In one or more embodiments, the naturally obtained image 500 may be obtained camera of electronic device 100, or may be obtained from a different source such as natural image data 152 on network storage 150. Further, as described above, natural image data may be augmented or edited in some way, but is described as natural image data to clarify that the data is distinct from the synthesized image data generated by appearance transfer network 136.

According to one or more embodiments, the naturally obtained image 500 may be input into an appearance transfer network 136 to obtain a set of synthesized images depicting the scene of naturally obtained image 500 under various conditions. According to one or more embodiments, the naturally obtained image 500 may be input into the appearance transfer network 136 along with one or more target conditions, and the appearance transfer network 136 will map the naturally obtained image 500 to synthetic images 505A, 505B, and 505C based on the target conditions. Thus, as shown for example purposes, a first synthetic image 505A may be generated with different lighting, a second synthetic image 505B may be generated to show the scene with different weather conditions (i.e., an overcast day), and a third synthetic image 505C may be generated to show the scene at night.

Separately, according to one or more embodiments, a keypoint detector 510 may detect one or more keypoints in the naturally obtained image 500, and identify an initial patch 515 that includes the keypoint. According to one or more embodiments, patches may be identified for each of one or more keypoints in the naturally obtained image 500. Further, according to one or more embodiments, the keypoint detector may detect keypoints and identify patches from one of the synthetic images 505.

At 520, the descriptor module 124 will identify the equivalent image location of the initial patch 515 in the remaining images of the set (e.g., synthetic images 505). The result is additional patches 525, which include the patches obtained from the remaining images (e.g., the synthetic images 505) based on the image location of the initial patch 515. Finally, the initial patch 515 and the additional patches 525 may be utilized to train a descriptor network 530 to provide localization information.

According to one or more embodiments, by having perfectly aligned patches depicting a same keypoint under a variety of conditions, the descriptor network may be trained to produce condition-invariant descriptors. Specifically, a loss function for the descriptor network may utilize the baseline image patch and the appearance transformed image patches to minimize the distance between descriptors of each patch. Thus, the trained descriptor network will produce very similar descriptors for the keypoint present in the patches. As such, the descriptor network may be run on an image during inference to match against a database of images regardless of the conditions when the input image was captured and the conditions when the database images were captured.

Figure 6:
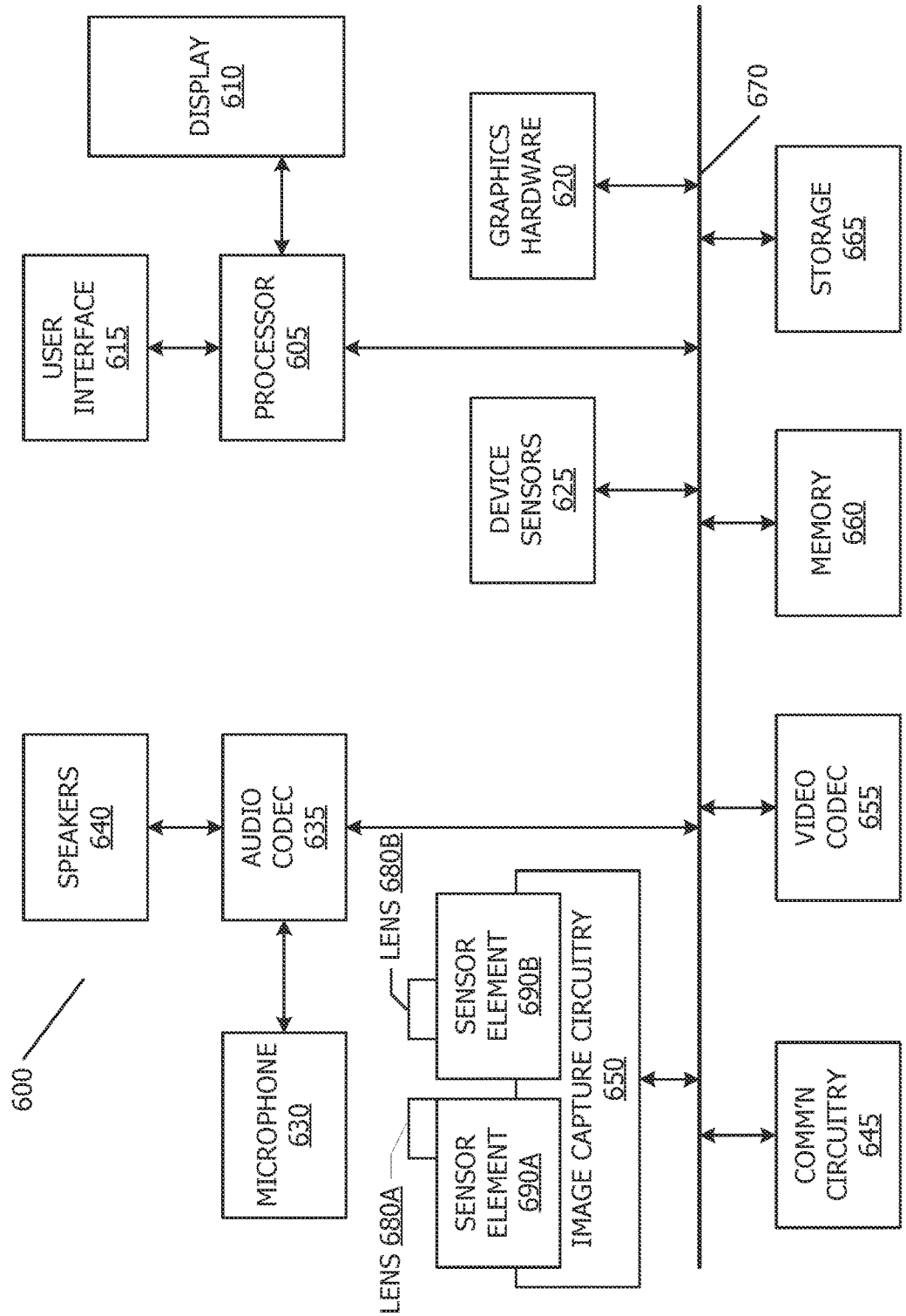
FIG. 6 shows, in block diagram form, a computer system in accordance with one or more embodiments.

Referring now to FIG. 6, a simplified functional block diagram of illustrative multifunction electronic device 600 is shown according to one embodiment. Each of electronic devices may be a multifunctional electronic device, or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 650. Images so captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to estimate emotion from an image of a face. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-5 or the arrangement of elements shown in FIGS. 1 and 8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable instructions executable by one or more processors to:
    obtain a first image of a scene associated with a first condition;
    determine one or more target conditions;
    apply an appearance transfer network to the first image to obtain one or more synthesized images comprising the scene, wherein the scene is associated with the one or more target conditions in the synthesized image;
    select a first patch from the first image, wherein the first patch comprises a keypoint;
    determine an image location of the first patch;
    obtain a one or more additional patches from the one or more synthesized images based on the determined image location; and
    train a descriptor network to provide localization data based on the first patch and the one or more additional patches.

2. The non-transitory computer readable medium of claim 1, wherein the appearance transfer network is trained to generate an output image according to an input image and a target condition,
    wherein the appearance transfer network is trained based on images of a scene associated with a plurality of conditions.

3. The non-transitory computer readable medium of claim 2, wherein the images of the scene associated with a plurality of conditions comprises:
    determining a plurality of sequences of images, wherein each sequence is associated with a unique condition of the plurality of conditions;
    determining a trajectory associated with each of the plurality of sequences; and
    align the images of the scene based on the determined trajectories.

4. The non-transitory computer readable medium of claim 1, wherein the computer readable instructions to obtain a one or more additional patches further comprises computer readable instructions to:
    determine a plurality of pixel locations comprising the image location of the first patch in the first image; and
    for each synthesized image, obtain a set of pixels in the synthesized image at the plurality of pixel locations.

5. The non-transitory computer readable medium of claim 1, wherein the localization data comprises condition-invariant descriptors.

6. The non-transitory computer readable medium of claim 1, wherein the target conditions are associated with variations of illumination of the scene.

7. The non-transitory computer readable medium of claim 1, wherein the target conditions are associated with variations of environmental conditions of the scene.

8. A system for providing localization data, comprising:
    one or more processors; and
    one or more computer readable medium comprising computer readable instructions executable by one or more processors to:
        obtain a first image of a scene associated with a first condition;
        determine one or more target conditions;
        apply an appearance transfer network to the first image to obtain one or more synthesized images comprising the scene, wherein the scene is associated with the one or more target conditions in the synthesized image;
        select a first patch from the first image, wherein the first patch comprises a keypoint;
        determine an image location of the first patch;
        obtain a one or more additional patches from the one or more synthesized images based on the determined image location; and
        train a descriptor network to provide localization data based on the first patch and the one or more additional patches.

9. The system of claim 8, wherein the appearance transfer network is trained to generate an output image according to an input image and a target condition, wherein the appearance transfer network is trained based on images of a scene associated with a plurality of conditions.

10. The system of claim 9, wherein the images of the scene associated with a plurality of conditions comprises:

determining a plurality of sequences of images, wherein each sequence is associated with a unique condition of the plurality of conditions;

determining a trajectory associated with each of the plurality of sequences; and align the images of the scene based on the determined trajectories.

11. The system of claim 8, wherein the computer readable instructions to obtain a one or more additional patches further comprises computer readable instructions to:

determine a plurality of pixel locations comprising the image location of the first patch in the first image; and for each synthesized image, obtain a set of pixels in the synthesized image at the plurality of pixel locations.

12. The system of claim 8, wherein the localization data comprises condition-invariant descriptors.

13. The system of claim 8, wherein the target conditions are associated with variations of illumination of the scene.

14. The system of claim 8, wherein the target conditions are associated with variations of environmental conditions of the scene.

15. A method for providing localization data, comprising:

obtaining a first image of a scene associated with a first condition;

determining one or more target conditions;

applying an appearance transfer network to the first image to obtain one or more synthesized images comprising the scene, wherein the scene is associated with the one or more target conditions in the synthesized image;

selecting a first patch from the first image, wherein the first patch comprises a keypoint;

determining an image location of the first patch;

obtaining a one or more additional patches from the one or more synthesized images based on the determined image location; and training a descriptor network to provide localization data based on the first patch and the one or more additional patches.

16. The method of claim 15, wherein the appearance transfer network is trained to generate an output image according to an input image and a target condition, wherein the appearance transfer network is trained based on images of a scene associated with a plurality of conditions.

17. The method of claim 15, wherein obtaining one or more additional patches further comprises:

determining a plurality of pixel locations comprising the image location of the first patch in the first image; and for each synthesized image, obtaining a set of pixels in the synthesized image at the plurality of pixel locations.

18. The method of claim 15, wherein the localization data comprises condition-invariant descriptors.

19. The method of claim 15, wherein the target conditions are associated with variations of illumination of the scene.

20. The method of claim 15, wherein the target conditions are associated with variations of environmental conditions of the scene.

* * * * *